E. L. CLOSE.
MUSICAL BLOCKS.
APPLICATION FILED JULY 14, 1916.
1,309,116. Patented July 8, 1919.
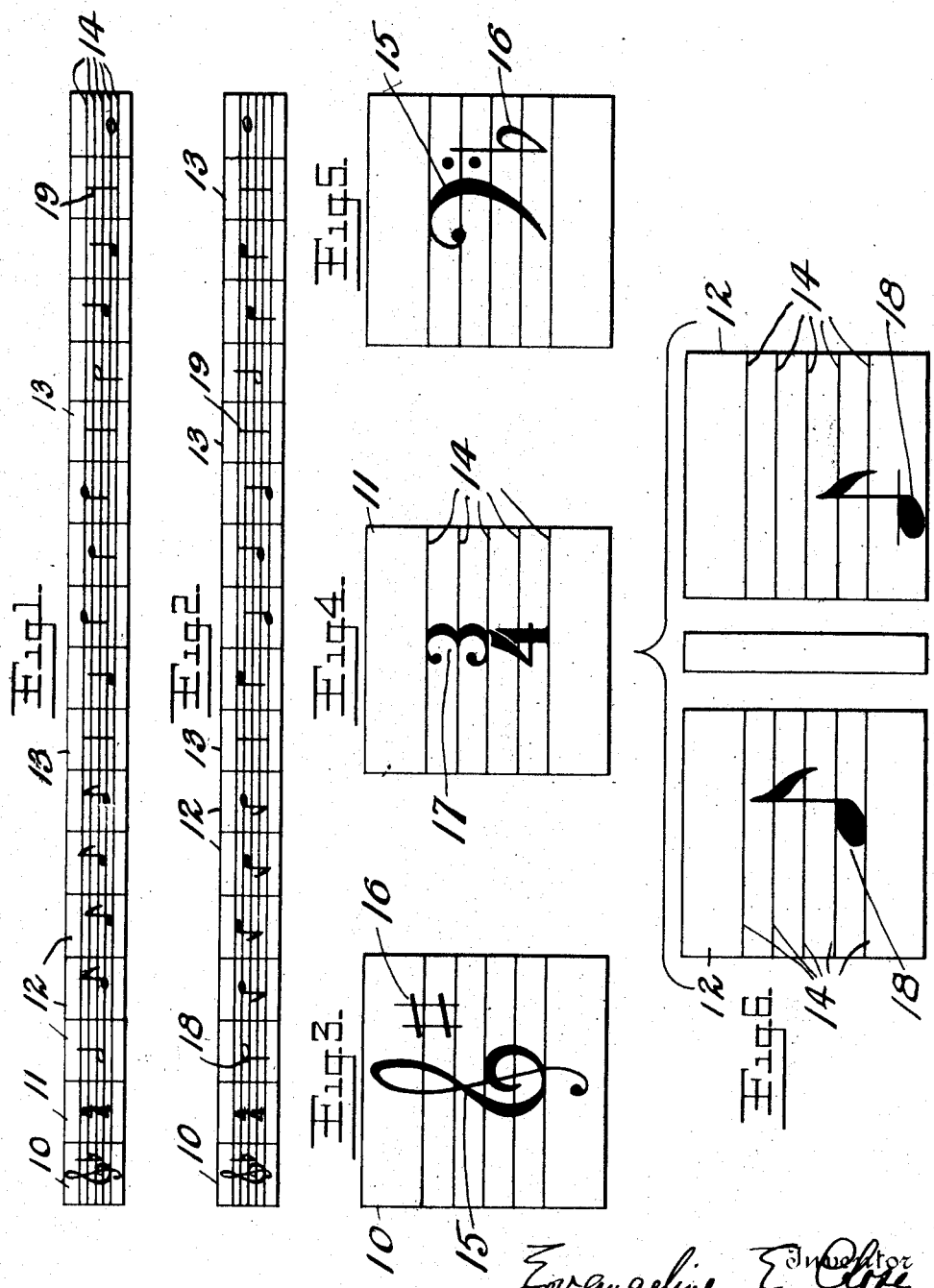

UNITED STATES PATENT OFFICE.

EVANGELINE L. CLOSE, OF BROOKLYN, NEW YORK.

MUSICAL BLOCKS.

1,309,116.   Specification of Letters Patent.   Patented July 8, 1919.

Application filed July 14, 1916. Serial No. 109,217.

*To all whom it may concern:*

Be it known that I, EVANGELINE L. CLOSE, a citizen of the United States, residing at Brooklyn, in the county of Kings and State of New York, have invented certain new and useful Improvements in Musical Blocks, of which the following is a specification.

My invention has for its object to entertain and at the same time to instruct in musical composition, special objects being to provide apparatus for such purposes in the nature of a game which will be of general interest.

In the attainment of these objects I employ a set of blocks having staff lines extending entirely across the faces thereof so that when placed together the blocks will form a musical staff, and mark on such blocks musical notations of different significance so that the blocks may be assembled in different relations to indicate different musical effects.

In the accompanying drawing I have illustrated the invention embodied in practical form, wherein:

Figure 1 is a face view of a group of the blocks arranged to indicate a familiar tune;

Fig. 2 is a similar view showing the same note blocks reversed or turned around end-for-end;

Fig. 3 is an enlarged view of a "treble clef" block;

Fig. 4 is a like view of a "time" block;

Fig. 5 is a view of a "bass clef" block; and

Fig. 6 is a compound figure showing face and edge views of one of the "note blocks."

In the illustration, four types of blocks are shown, clef blocks, 10, time blocks, 11, note blocks, 12, and bar blocks 13, all of said blocks bearing on their faces staff lines 14, extending entirely across such faces, so as to register and form when the blocks are assembled in edge-to-edge relation, a complete musical staff.

Each block bears an appropriate musical symbol or notation, the clef blocks bearing a clef mark 15, either treble or bass, as indicated in Figs. 3 and 5, respectively, and which may be "sharped" or "flatted" for various keys, as indicated at 16; the time blocks bearing time indications 17; the note blocks having note indications 18, and the bar blocks having the bar indications 19.

In Fig. 1 I have shown a group of the blocks arranged to form a measure of a familiar tune, and in Fig. 2 I have shown how the same note blocks may be reversed or turned end-for-end so as to make these same notes indicate a different pitch.

A greater variety of effects is made possible by utilizing more than a single face of the blocks and by providing indications of different significance on the different faces. Thus the note block shown in Fig. 6 bears notes of different pitch on its opposite faces. The turning of this block over therefore gives a choice of two notes, and by reversing the block end-for-end these two notes may be given different pitch; other variations may be made by substituting different clef blocks at the head of the staff. The blocks may be used in various ways, for instance, as a game, governed by suitable rules. One simple and instructive method is to use them to copy melodies from familiar song books. This teaches composition, gives the notes a more tangible and real pitch, teaches quick reading and singing at sight and leads also to independent composing.

I claim:

1. A set of blocks having staff lines on different faces thereof adapted to register when the blocks are placed edge-to-edge, and musical characters of similar value but different significance associated with the staff on the different faces of each block, whereby a variety of musical effects may be produced by bringing the different faces of the several blocks into registering relation.

2. A set of blocks of uniform size having symmetrically disposed staff lines extending entirely across opposite faces of the same adapted to register when the blocks are placed in edge-to-edge relation, and musical notations of similar time values but different significance on opposite faces of each block, the notations of one block differing from those of another block, whereby various musical effects may be produced by bringing the different faces of the blocks into register and by reversing the blocks.

In testimony whereof I affix my signature in presence of two witnesses.

EVANGELINE L. CLOSE.

Witnesses:
   CARL S. BROWN,
   W. S. O'CONNELL.

Copies of this patent may be obtained for five cents each, by addressing the "Commissioner of Patents, Washington, D. C."